Oct. 13, 1964  J. GIAMPA ET AL  3,152,820
FERRULE FOR FISHING RODS
Filed July 29, 1960

INVENTORS.
MICHAEL DASTOLI
BY  JOSEPH GIAMPA
*William S. Henry*
ATTORNEY.

3,152,820
FERRULE FOR FISHING RODS
Joseph Giampa, 3 Strawberry Hill Road, Andover, Mass., and Michael Dastoli, McGregor Drive, Stamford, Conn.
Filed July 29, 1960, Ser. No. 46,224
2 Claims. (Cl. 287—108)

This invention pertains to a ferrule for flexible fishing rods of various types such as a bait casting rod, spin bait casting rod, open face spin casting rod, fly casting rod and a surf casting rod. More particularly the invention pertains to a thermoplastic ferrule which gives a sectional rod, whether of two or more sections, the feel, action and flexibility characteristics of a continuous, or one piece rod. It is noted, that the term rod as used herein, and in the art to which the invention pertains, includes both hollow tubular rods as well as a solid or massive rod.

As far as is known the only ferrule which has received acceptance and is in wide use today is metallic, either brass, aluminum or stainless steel. The disadvantages of a metallic ferrule, particularly for salt water fishing, are apparent since a metallic ferrule will eventually corrode and the male and female parts of the ferrule "freeze" together i.e. become bonded by an oxidized interface. It is also considered obvious that a thermoplastic ferrule or a thermoplastic coated metallic ferrule will to a large degree eliminate the corrosion problem. However, it was a complete surprise to discover that a thermoplastic ferrule can totally change the feel, action and flexibility of the same rod from which a metallic ferrule is removed and replaced with a ferrule according to this invention. Therefore, it is emphasized that this invention pertains to a thermoplastic ferrule for a sectional rod, preferably of well known fiber glass material, which overcomes the corrosion disadvantage of metallic ferrules, which could be expected, and completely unexpectedly changes the characteristic of a ferruled rod to substantially match the favorable characteristics of a continuous or one piece rod.

Further, the ferrule of this invention offers additional material advantages over metal ferrules in that it is capable of withstanding far greater shear, compressive and tensile strains and stresses, has far superior fatigue endurance, is corrosion and abrasion resistant, self lubricating and weighs only about half as much as a metal ferrule.

Therefore, a primary object of the invention is to provide a thermoplastic ferrule for sectional fishing rods which will give such rods the same characteristics attained by a one piece rod.

A further object of the invention is to provide a flexible thermoplastic ferrule for a fishing rod which is highly fatigue resistant, abrasion and corrosion resistant; has high tensile and flexural strength and resilience, is self lubricating and light weight.

The foregoing objects and additional objects and advantages will be apparent from the following detailed description given in connection with the appended illustrative drawings of a specific presently preferred embodiment of the invention wherein.

Figure 1:
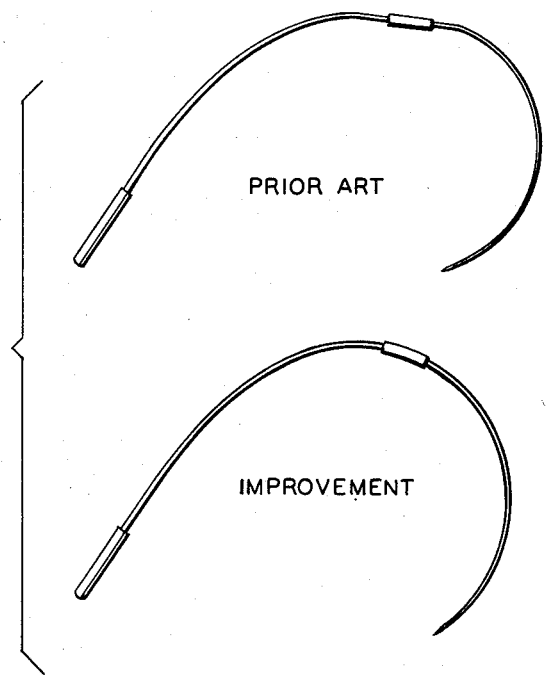
FIG. 1 is a schematic illustration of a fishing rod according to the prior art as compared to a fishing rod according to this invention.

FIG. 1 of the drawing schematically illustrates a comparison between a fishing rod having a prior art metallic ferrule and the same rod improved by having a thermoplastic ferrule according to this invention. The improvement thus illustrated obviously does not show that the rod with a thermoplastic ferrule provides the same action and feel of a continuous rod, but it does demonstrate that the improved rod has the same flexural characteristics as evidenced by a smooth continuous curve identical to that of a continuous rod. A further advantage attained over rods with metal ferrules and a ferrule of the invention, which is not illustrated since the condition is not normally approached in the use of fishing rods, is that the improved rod can be bent into an oval with the free ends in contact, and even beyond this unusual condition without ferrule failure or rupture and in addition without a permanent set. That is, the improved rod will return from such an extreme condition to its normal linear form. In this regard it is also noted that experiments have shown that the ferrule of this invention if held in a closed curve for long periods of time, such as a week, the improved rod will return to its normal linear form within a relatively short time of being released. Under the same conditions a metallic ferrule will rupture before the ends of the rod are brought together. It may be contended that the immediately foregoing statements do not demonstrate a practical improvement, however it is submitted that it does show a ferrule or a ferrule rod can be made to have the same characteristics of a continuous rod which in the experiments noted above were conducted with fiber glass rods and acetal resin ferrules of the type shown in FIG. 2.

Figure 2:
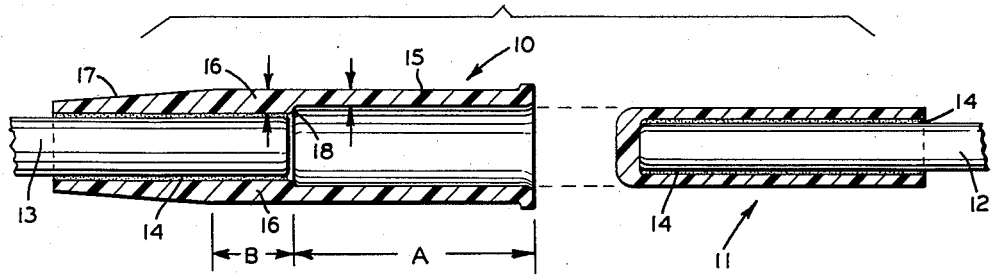
FIG. 2 is a detailed, exploded cross-sectional view of a ferrule according to the invention comprising male and female parts.

As seen in FIG. 2 a preferred ferrule according to the invention comprises a female element 10 and a sleeve element 11 both made of acetal resin $(OCH_2)_n$ commonly known by the tradename Delrin.[1] As stated above it is preferred that the ferrule comprise two elements 10 and 11 to obtain a dependable interference fit between the rod sections or ferrule elements 10 and 11. However, a satisfactory fit may be obtained between the rod proper and the female ferrule. The ferrule elements 10 and 11 are bonded to the rod sections 12 and 13 with a suitable resilient epoxy resin 14, such as Hysol,[2] a product of the Hysol Co., which is an epoxy resin and a modified polyamide hardener. Epoxy resins cured with aliphatic amine hardeners at room temperature may also be suitable.

The female section 10 comprises a receiving section 15 of length A and a fulcrum section 16 of length B. The tapered section 17 is of any suitable length adapted to provide a sufficient bonding area between the female ferrule and attached rod portion 13. While not shown in FIG. 2 the end of rod 13 may be and preferably is inserted into section 17 substantially up to the shoulder 18 and when the rod sections are set up, i.e. joined for use, the sleeve 11 is inserted into abutment with shoulder 18. An outstanding ring 19 integral with receiving section 15 is provided to insure that section 15, under heavy load conditions, does not elongate radially.

At the outset it was stated that the result in feel, action and flexibility improvement of a section rod fitted with an acetal resin ferrule was a completely new and unexpected result and by experiment it has been determined that this result appears to be due not to the use of acetal resin alone, but to the combination therewith of properly proportioning the female ferrule 10. Thus, if the fulcrum section 16 of ferrule element 10 is not within defined limits with regard to length and wall thickness, the acetal resin will rupture in substantially the same manner under test as is common with metallic ferrules. This same phenomena occurs with other thermoplastics as well, even though a ferrule of the same proportions made from an acetal resin can withstand the severest strength, flexural and fatigue tests. Therefore, it appears that the results provided by the invention can only be achieved with a particularly designed ferrule of certain limited thermoplastics.

---
[1] Delrin is a registered trademark of the E. I. du Pont de Nemours & Co., Inc.
[2] Hysol—registered trademark of Hysol, Inc.

The thermoplastics found suitable for use in the ferrule of the invention are acetal resin, which is presently preferred, such as the "Delrin" 500[3] series and particularly Delrin 507[4] due to its resistance to ultraviolet light discoloration; polycarbonate, polypropylene and polyamide resins are also considered acceptable if characterized by dimensional stability in the presence of moisture as is characteristic of Delrin.

The critical dimensions of the ferrule are shown in FIG. 2 as A, the length of the receiving section 15 and the wall thickness X thereof, and the length of the fulcrum section B and the wall thickness Y thereof. Thus, the following limits are given for the ferrule dimensions:

Length A: Not substantially less than 1 inch nor greater than 1.5 inches.
Length B: Not substantially less than 0.125 inch nor substantially greater than 0.500 inch.
Wall thickness X: Not substantially less than 0.073 inch nor greater than 0.091 inch.
Wall thickness Y: Not substantially less than 0.082 inch nor substantially greater than 0.105 inch.

It wil be obvious to those skilled in the art that the above dimensions, while considered critical to achieve the desired end result can be varied slightly but with a proportional dimunition of the results. Thus, the above description is given by way of illustration and is not intended to limit the scope of the invention defined by the subjoined claims.

We claim:
1. An article of manufacture comprising a fishing rod having at least a first and second section and a ferrule constituted of material selected from the group consisting of acetal, polycarbonate, polypropylene and polyamine resin and characterized by dimensional stability in the presence of moisture; said ferrule comprising a member having a first portion for securing said ferrule to one end of a rod section and a second portion for removably securing another rod section to said first rod section, and a fulcrum portion between said first and second portions, said second portion having a length dimension not substantially less than 1 inch nor substantially greater than 1.5 inches and a corresponding thickness not substantially less than .073 inch and not substantially greater than .091 inch, and said fulcrum portion having a length dimension not substantially less than .125 inch nor substantially greater than .5 inch and a corresponding thickness not substantially less than .082 inch and not substantially greater than .105 inch.

2. An article of manufacture according to claim 1 wherein said rod section receivable in said second ferrule portion is provided with a sleeve of the same material as said ferrule fixedly secured thereto, said sleeve being dimensioned to provide a tight fit between said sleeve and said second ferrule portion.

References Cited by the Examiner
UNITED STATES PATENTS

| | | | |
|---|---|---|---|
| 1,918,583 | 7/33 | Bear | 287—119 |
| 2,297,336 | 9/42 | White | 339—205 |
| 2,394,632 | 2/46 | Parker. | |
| 2,470,359 | 5/49 | McLean | 285—237 |
| 2,735,699 | 2/56 | Chadbourne. | |
| 2,764,452 | 9/56 | Anderson et al. | |
| 2,868,863 | 1/59 | Cook | 287—76 |

OTHER REFERENCES

Modern Plastics Magazine, April 1958. Reprint: "Lexan Polycarbonate Resin," Breskin Publication, Inc.

Product Engineering, September 1958. Reprint: "Three New Tough Rigid Theruoplastics a Comparison," McGraw-Hill Publishing Co., Inc.

CARL W. TOMLIN, Primary Examiner.

MORRIS M. FRITZ, WALTER SCHEEL, Examiners.

---
[3] See footnote 1.
[4] See footnote 1.